(12) United States Patent
Ketcham

(10) Patent No.: US 6,497,433 B1
(45) Date of Patent: *Dec. 24, 2002

(54) COUPLING ASSEMBLIES FOR PROVIDING FLUID CONNECTION

(75) Inventor: Mark G. Ketcham, East China, MI (US)

(73) Assignee: TI Group Automotive Systems Corporation, Warren, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/372,168

(22) Filed: Aug. 20, 1999

(51) Int. Cl.[7] ................................. F16L 55/00
(52) U.S. Cl. .................... 285/45; 285/81; 285/319; 29/453; 29/890.14
(58) Field of Search ..................... 285/81, 82, 319, 285/45, 356, 353, 233, 383; 29/453, 890.14

(56) References Cited

U.S. PATENT DOCUMENTS

| | | | |
|---|---|---|---|
| 3,223,438 A | * 12/1965 | DeCenzo | 285/353 |
| 4,135,745 A | * 1/1979 | Dehar | 285/319 |
| 4,193,616 A | * 3/1980 | Sarson et al. | 285/356 |
| 4,842,309 A | * 6/1989 | LaVene et al. | 285/353 |
| 5,593,188 A | * 1/1997 | McNaughton et al. | 285/319 |
| 5,794,984 A | * 8/1998 | Bartholomew | 285/45 |
| 5,803,512 A | * 9/1998 | Hollnagel | 285/319 |
| 5,975,587 A | * 11/1999 | Wood et al. | 285/383 |
| 5,992,903 A | * 11/1999 | Bartholomew | 285/319 |

FOREIGN PATENT DOCUMENTS

| | | | | |
|---|---|---|---|---|
| CZ | 69072 | * | 5/1941 | 285/356 |
| FR | 873898 | * | 7/1942 | 285/383 |

* cited by examiner

Primary Examiner—Lynne H. Browne
(74) Attorney, Agent, or Firm—Wood, Phillips, VanSanten, Clark & Mortimer (57) ABSTRACT

A coupling assembly comprising a female connector body, a male member, a retainer and a dust barrier with integral secondary latch. The female connector body defines a bore extending axially inwardly into the body from an entrance. A radial face is defined in the bore axially inwardly of the entrance. The male member is received within the bore and having a radially enlarged annular upset. The retainer has at least two locking beams extending between the upset and the radial face to retain the male member in the bore. The locking beams define a slot between said locking beams. The dust barrier with integral secondary latch is slidably mounted on the male member axially outward of the retainer. The dust barrier has a skirt surrounding the entrance. The dust barrier further has at least one leg extending axially inward into the bore engaging the radial face to secure the dust barrier to the female connector body. The leg fits within the slot between the locking beams so as to prevent inadvertent radially inward movement of the locking beams.

10 Claims, 6 Drawing Sheets

COUPLING ASSEMBLIES FOR PROVIDING FLUID CONNECTION

BACKGROUND OF THE INVENTION

This application relates to fluid line systems which include coupling assemblies, and more particularly to a coupling assembly of the type for connecting a male member formed at the end of a tube in a hollow female connector body.

In the automotive and other fields, one type of coupling assemblies often utilized to provide a fluid connection between two components or conduct are quick connector couplings, which generally include a male member received and retained in a female connector body. Use of a quick connector coupling is advantageous in that a sealed and secured fluid line may be established with a minimum amount of time and expense.

A retainer is often used to secure the male member within the connector body. One such type of retainer includes a plurality of locking beams which extend between a radial upset formed on the male member and a radial face defined in the connector body. The abutment of the retainer with the radial upset at one end and the radial face at the other end prevents the withdrawal of the male member from the connector body. This type of retainer is prevalent in the art and has proven effective in many fluid line applications.

Nevertheless, such retainers have occasionally been prone to failure. During the installation of the retainer, the retainer may be inserted insufficiently into the female body for the abutting portion of the retainer to surpass the radial face defined in the connector body. In addition, even if the retainer is installed properly, the retainer may be accidentally released. To assure that the retainer is properly installed and to prevent the accidental release of the retainer, secondary or back-up latches have sometimes been utilized.

Another concern associated with the use of a retainer having a plurality of locking beams is contaminants entering into the entrance of connector body and being embedded between the locking beams. The presence of contaminants in the connector body can cause the male member, connector body or retainer to erode and fail prematurely. Furthermore, for the type of retainer which is removable by compressing the locking beams in an inwardly radial direction, the presence of contaminants embedded between the locking beams prevents the radial compression of the locking beams.

Another type of coupling assembly often utilized to provide a fluid connection between two components or conduits includes a tube nut for securing the male member within the connector body. Such coupling assembly typically includes a male member having a flare formed at the distal end and an enlarged upset formed at a given distance from the distal end. The male member is received and retained in a female connector body by a tube nut.

The female connector body has an entrance, a threaded bore axially inward from the entrance and a non-threaded bore axially inward from the thread bore terminating at an annular face. An externally threaded hex head tube nut having an annular stop defined at the terminal of the tube nut is slidably mounted on the tube forming the male member. To connect the coupling assembly, the male member is first inserted into the female connector body. The tube nut is then slid toward the female connector body and threaded into the bore of the female connector body. As the hex head tube nut is threaded into the female connector body, the annular stop of the hex head tube nut abuts the enlarged upset of the male member and applies an axially inward force on the male member. This axially inward force crushes the flare of the male member against the annular face of the female connector body. The crushing of the flare reduces the axial length of the flare and simultaneously enlarges the diameter of the flare. The flare is crushed until the outer radial surface of the flare contacts the cylindrical surface of the non-threaded bore, thus creating a seal between the male member and the female connector body. This type of coupling assembly is prevalent in the art and has proven effective in many fluid line applications.

Nevertheless, such coupling assemblies have occasionally been prone to failure. To form an effective seal between the male member and the female connector body, the tube nut must be It sufficiently tightened for the flare of the male member to expand to the diameter of the non-threaded bore. Such control on torque tolerance is time consuming and expensive.

SUMMARY OF THE INVENTION

A coupling assembly comprising a female connector body, a male member, a retainer and a dust barrier with integral secondary latch. The female connector body defines a bore extending axially inwardly into the body from an entrance. A radial face is defined in the bore axially inwardly of the entrance. The male member is received within the bore and having a radially enlarged annular upset. The retainer has at least two locking beams extending between the upset and the radial face to retain the male member in the bore. The locking beams define a slot between said locking beams. The dust barrier with integral secondary latch is slidably mounted on the male member axially outward of the retainer. The dust barrier has a skirt surrounding the entrance. The dust barrier further has at least one leg extending axially inward into the bore engaging the radial face to secure the dust barrier to the female connector body. The leg fits within the slot between the locking beams so as to prevent inadvertent radially inward movement of the locking beams.

DETAILED DESCRIPTION OF THE INVENTION

Figure 1:
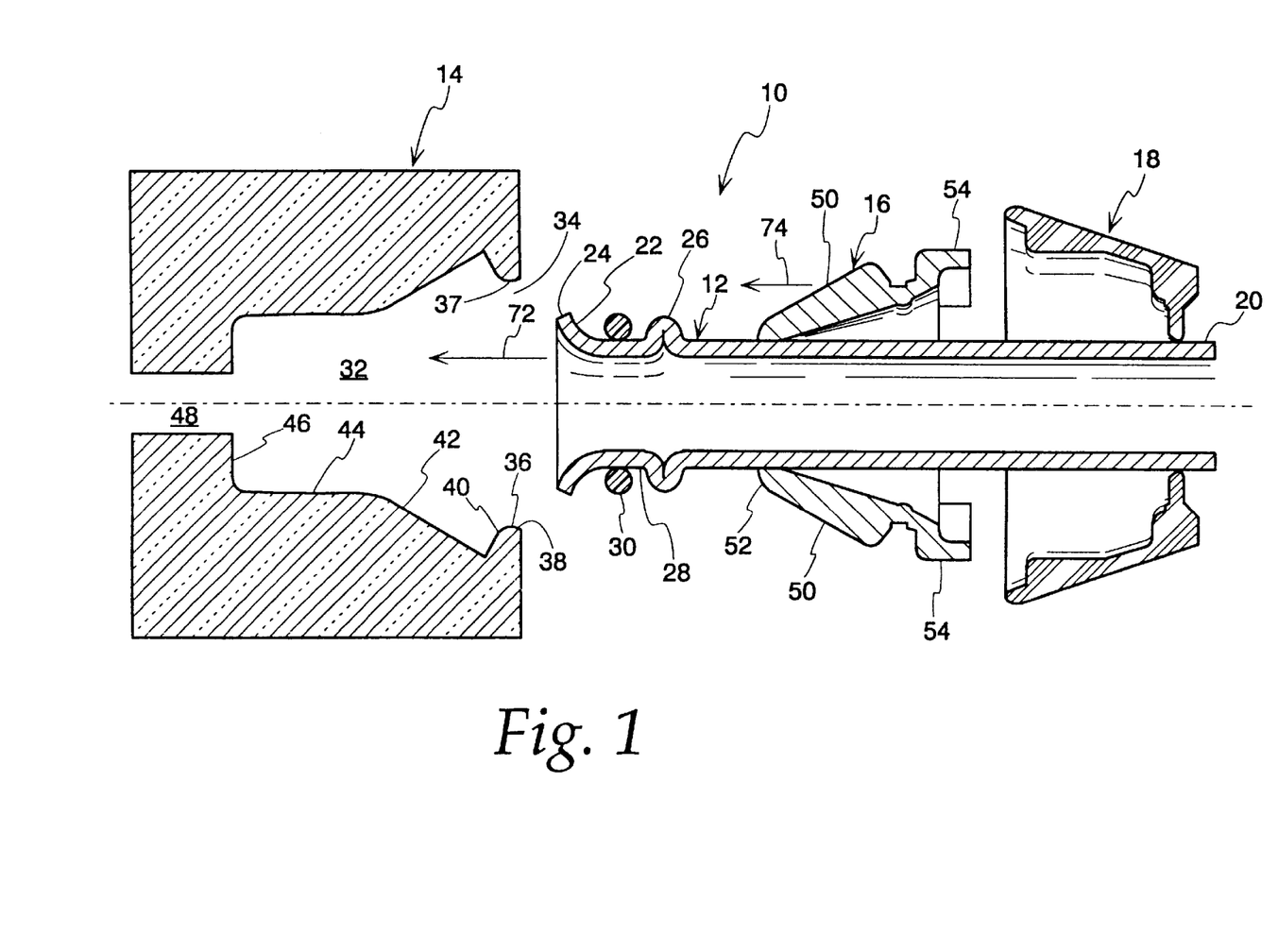
FIG. 1 is a section taken through a first embodiment of a coupling assembly prior to assembling the coupling assembly.
Figure 2:
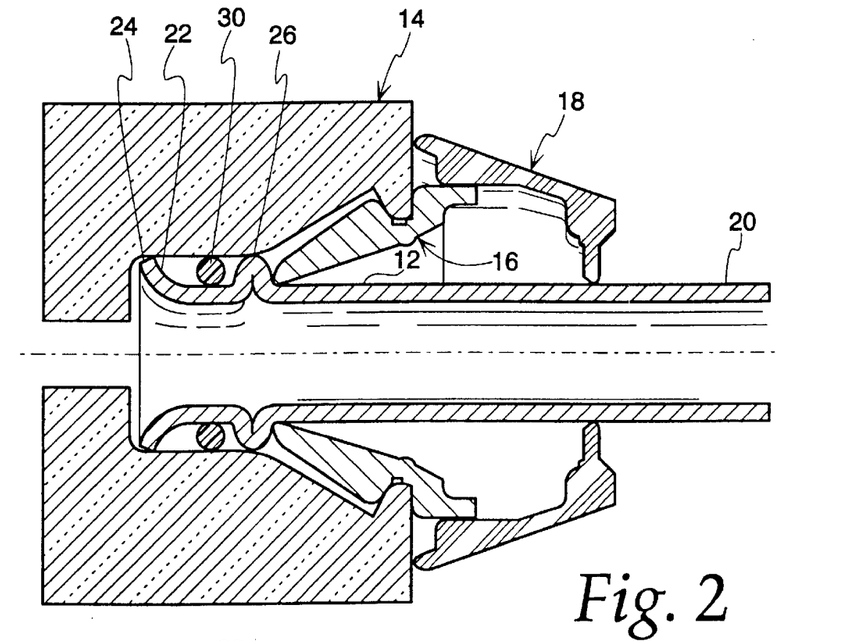
FIG. 2 is a section taken through the coupling assembly of FIG. 1 as assembled.
Figure 3:
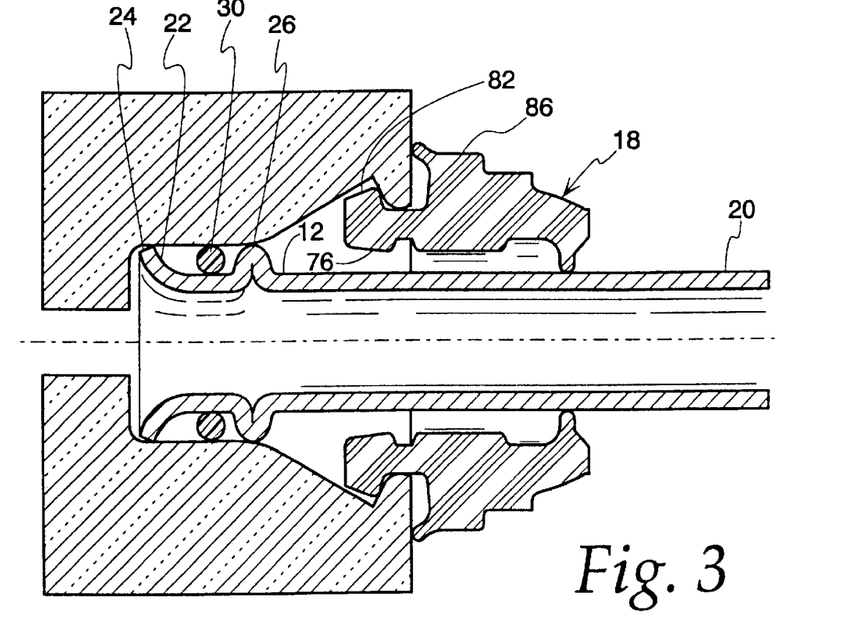
FIG. 3 is a section taken ninety degrees from the coupling assembly of FIG. 2.

FIGS. 1–3 illustrate a first embodiment of a coupling assembly 10 of the present invention. The coupling assembly 10 comprises a male member 12, a hollow female connector body 14, a retainer 16 and a dust barrier with integral secondary latch 18.

Male member 12 is formed at the end of a hollow and rigid tube 20 which forms a part of a fluid line system. The tube 20 may lead to a component in a fluid line system, or may itself be a portion of a component in a fluid line system. Male member 12 has a radially enlarged distal end 22 located at the end of the tube 20. The diameter of distal end 22 is greater than the diameter of tube 20. The terminal surface 24 of the distal end 22 is such that the terminal surface 24 fits snugly within connector body 14. The terminal surface 24 of the distal end 22 is chamfered to facilitate the insertion of male member 12 into connector body 14.

Male member 12 further includes a radially enlarged annular flange or upset 26 formed at a given distance from the distal end 22. The diameter of the upset 26 is approximately equal to the diameter of the distal end 22. Hence, the outer diameter of upset 26 is also such that the upset 26 fits snugly within connector body 14.

A cylindrical channel 28 extends between upset 26 and distal end 22. Channel 28 has an outer diameter equal to the outer diameter of tube 20 and smaller than either the outer diameter of the distal end 22 or the outer diameter of the upset 26. While the snug fit of the distal end 22 and the upset 26 within the connector body reduces the leakage of the fluid system, an O-ring can be used to further reduce the leakage. An O-ring 30 is inserted into channel 28 such that upon insertion of the male member into the connector body, the O-ring 30 fits tightly within connector body 14 and channel 28. The O-ring 30 is situated between the distal end 22 and upset 26, thus preventing the O-ring 30 from sliding or rolling axially along the length of the male member 12.

Female connector body 14 is hollow and defines an axial bore 32 extending axially inward from an entrance 34. Entrance 34 is defined by a radially inward extending rim 36 having an apex 37. Rim 36 is chamfered at the axially outward surface 38 to facilitate the insertion of male member 12 into connector body 14. Axially inward from entrance 34 is an abutment radial face 40. Axially inward from the radial face 40 is a conical surface 42. Axially inward from the conical surface 42 is a cylindrical surface 44 terminating at an annular face 46. Located at the center of the annular face 46 is the entrance to a reduced diameter cylindrical bore 48 forming the fluid line opposite of the tube 20. The cylindrical surface 44 together with the annular face 46, the conical surface 42 and the radial face 40 define bore 32. The diameter of the cylindrical surface 44 is slightly larger than the outer diameter of the distal end 22 and upset 26 such that, when the male member 12 is inserted into the axial bore 32, the male member fits snugly within the connector body 14.

A retainer 16 is slidably mounted on the tube 20 and located axially outward from the upset 26. Retainer 16 is made of plastic, preferably PA 12, PA 612, PEEK or PPA. It comprises two flexible locking beams 50 extending radially and axially outward from a base ring 52. Upon insertion of the male member into the female connector body, retainer 46 is slid toward the connector body 14 wherein a portion of retainer 16 will be disposed in bore 32 of connector body 14 to secure male member 12 within connector body 14.

Figures 4, 5, 6, 7:
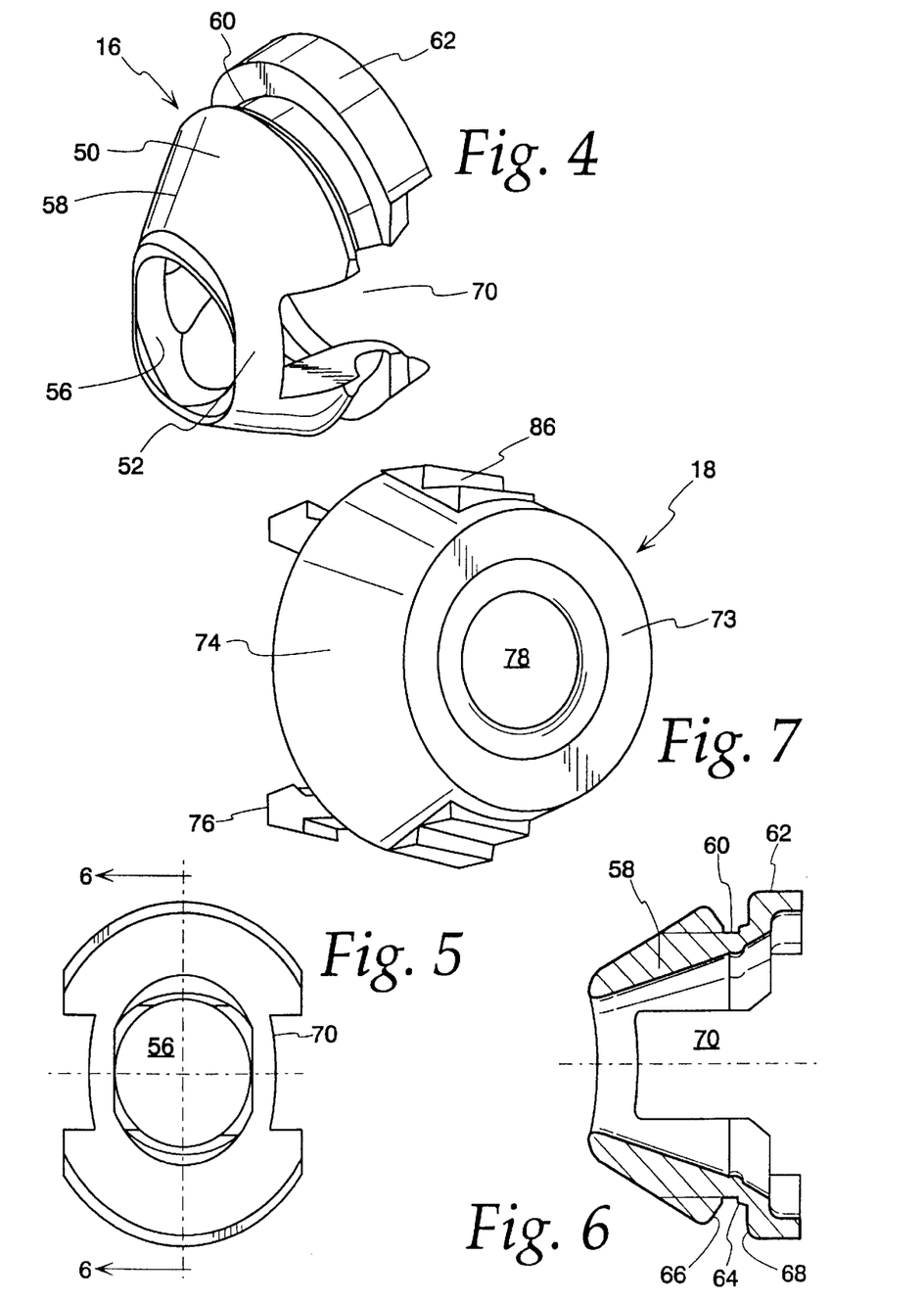
FIG. 4 is a perspective view of a retainer.
FIG. 5 is a front view of the retainer.
FIG. 6 is a cross-sectional view of the retainer as taken along line 6—6 of FIG. 5.
FIG. 7 is a perspective view of a dust barrier with an integral secondary latch.

Retainer 16, as shown in FIGS. 4–6, comprises a base ring 52 and two locking beams 50. Base ring 52 has a central annular opening 56 with a diameter slightly larger than the outer diameter of tube 20, but less than the diameter of upset 26. Thus, the base ring 52 is able to slide along the tube 20 but cannot pass through upset 26. Since retainer 16 cannot pass through upset 26, the contact surface between base ring 52 and upset 26 ultimately establishes an abutment surface preventing the withdrawal of male member 12 once retainer 16 is in the locked position.

Two locking beams 50 are integrally joined to the base ring 52 and extend radially and axially outward from base ring 52. Each locking beam 50 has a tapered surface 58, a finger tab 62 and a channel 60 located between tapered surface 58 and finger tab 62. Channel 60 is defined by a reduced diameter surface 64, an inner face 66 and an outer face 68. Two rectangular shaped slots 70 are located between the locking beams 50 and are defined by locking beams 50 and base ring 52. The width of channel 60 is slightly wider than the thickness of rim 36. The diameter of reduced diameter surface 64 of channel 60 is slightly smaller than the apex 37 of rim 36. Thus, the overall size of channel 60 is slightly larger than the overall size of rim 36. This allows rim 36 to be situated and retained within channel 60 when retainer 16 is in the locked position.

After male member 12 has been fully inserted into the axial bore 32 in the direction of arrow 72, as shown in FIG. 1, such that distal end 22 of the male member 12 abuts annular face 46, the retainer 16 is inserted into the axial bore 32 in the direction of arrow 74. Upon insertion of retainer 16 into connector body 14, tapered surface 58 contacts rim 38. Since tapered surface 58 has a larger diameter than the apex 37 of rim 38, further force applied to the retainer in the direction of arrow 74 causes the locking beams to flex radially inward such that the diameter of the axially inward tapered surface in contact with rim 38 is the same diameter as the apex 37 of rim 38. The spacing provided by slots 70 allows adequate room for locking beams 50 to flex radially inward. As the retainer 36 is inserted further into axially bore 32, the spacing between the locking beams as defined by slot 70 becomes increasingly narrow. Hence, during the insertion of the retainer, the originally rectangular shaped slot 70 becomes increasingly triangular shaped.

The retainer is inserted until rim 36 surpasses the tapered surface 58 and enters into channel 60. When insertion of the retainer 16 causes the rim 36 to enter into channel 60, the locking beams 50 flex radially outward such that rim 36 is situated and retained within channel 60 in a locked position. Since the locking beams 50 flex radially outward, the spacing between the locking beams as defined by slot 70 would increase. Thus, upon full insertion of retainer 16 into connector body 14, slot 70 returns to its original rectangular shape.

Full insertion of retainer 16 into axial bore 32 not only situates rim 36 in channel 60, but also abuts axially inward surface of base ring 52 with upset 26 of male member 12. Hence, upon full insertion of retainer 16 into axial bore 32, a portion of the retainer 16 extends from upset 26 to radial face 40 of the rim 36. This portion of the retainer 16 restrains the male member 12 from being withdrawn from the female connector body 14.

To remove the male member from the female member, the retainer must be released such that the locking beam 50 is not abutting the radial face 40. To release the retainer, radially inward force is applied to the finger release tabs. The radially inward force moves the locking beams 50 in a radially inward direction. Once the outer diameter of the locking beams is smaller than the diameter of the apex 37 of the rim 36, the retainer 16 and the male member 16 can be slide axially outward from the connector body.

Foreign material entrapped in retainer 16 makes the above release procedure extremely difficult to perform. Furthermore, foreign material causes corrosion in the coupling assembly 10. To prevent foreign material from entering the coupling assembly 10 through the entrance 34, a dust barrier with integral secondary latch 18 is used to cover the exposed portion of retainer 16 and entrance 34. Similar to the retainer 16, the dust barrier 18 is slidably mounted on the tube 20 and is situated axially outward of the retainer 16. Upon insert of the retainer 16 into the female connector body 14, the dust barrier 18 slides axially inward toward the female connector body 14.

Another feature of the dust barrier 18 is that the leg portion 76 of the dust barrier also serves as a secondary latch. The function of the secondary latch is to assure that the retainer 16 is properly locked into position. Another function of the secondary latch is to prevent accidental release of the retainer.

Figure 8:
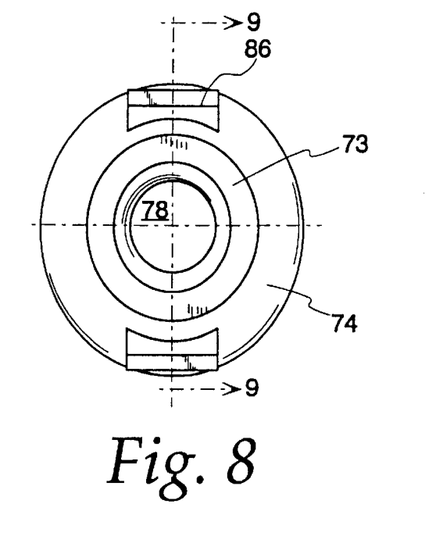
FIG. 8 is a front view of the dust barrier with integral secondary latch.

The barrier with integral secondary latch 18 is made of rubber, a rubber-like or plastic material. The barrier with integral secondary latch 18, as shown in FIGS. 7–8, comprises of a base ring 72, a skirt 74 and two legs 76. Base ring 72 has a central annular opening 78 with a diameter slightly greater than the outer diameter of the tube 20. A conical shaped skirt 74 extends axially inward and radially outward from the base ring 72. The skirt 74 is sized such that upon insertion of the dust barrier 18, the dust barrier 18 is able to cover the exposed portion of the entrance 34 and hence the terminal end 80 of the skirt 74 contacts the female connector body 14.

Figure 9:
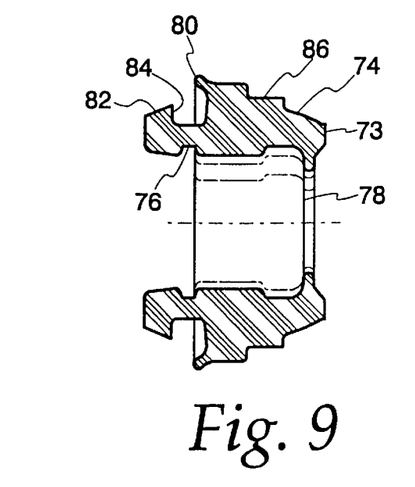
FIG. 9 is a cross-sectional view of the dust barrier with an integral secondary latch as taken along line 9—9 of FIG. 8.

A pair of legs 76, situated at diametrically opposed sides of the skirt (or one hundred and eighty degrees apart), are formed on the inside surface of the skirt 74 and extend axially inward from the base ring 72 to a distance beyond the terminal end 80 of the skirt 74. The width of each leg 76 is approximately equal to the distance between the locking beams 50 of the retainer or the width defined by slot 70. Formed at the terminal end of each leg 76 is a radially outward extending hook 82. The length of the leg 76 is such that, upon full insertion of the dust barrier 18 into the female connector body 14, the axially outward surface 84 of the hook 82 contacts the radial face 40 of rim 36, thus, retaining the dust barrier 18 onto the female connector body 14.

A pair of ridged surfaces 86 are formed on the outer surface of the skirt 74. The ridged surfaces 86 are situated on the opposite surface of the legs 76. Therefore, like legs 76, the ridged surfaces 86 are one hundred and eighty degrees apart.

The retainer 16 and dust barrier with integral secondary latch 18 function as follows. Both the retainer 16 and dust barrier with integral secondary latch 18 are slidably mounted on the tube 20. The male member 12 is inserted into the female connector body 14 until the terminal surface 24 of the male member 12 contacts the annular face 46 of the female connector body 14. The retainer 16 is then slid axially inward toward the female connector body 14. Upon insertion of the retainer 16, the tapered surface 58 of the retainer 16 contacts the rim 36 of the female connector body 14. Further force on the retainer 16 in the axially inward direction causes the locking beams 50 to flex radially inward due to the rim 36 pressing against the tapered surface 58. The retainer 16 is inserted until the base ring 52 of the retainer 16 contacts upset 26 of the male member 12. At the same point where the retainer 16 contacts the upset 26, rim 36 of the female connector body 14 enters into channel 60 of the locking beams 50. When the rim 36 enters into channel 60, the locking beams 50 spring radially outward to its locked position. In the locked position, the retainer prevents the male member 12 from being withdrawn from female connector body 14. When an axially outward force is applied to the male member 12, upset 26 abuts base ring 52 causing the inner face 66 of channel 60 to abut the radial face 40 of the female connector body 14, thus restraining the axially outward movement of the male member 12. Furthermore, the male member is restrained from any axially inward movement due to the terminal surface 24 of the male member 12 abutting the annular face 46 of the female connector body 14. Therefore, once the retainer 16 is in the locked position, movement of the male member 12 in either the axially inward or outward direction is restrained.

Furthermore, once the male member 12 is fully inserted into the female connector body 14, movement of the male member 12 in the radial direction is also restrained. The distal end 22 of the male member 12 and the upset 26 of the male member 12 have an outer diameter approximately the same as the diameter of cylindrical surface 44 of the female connector body 14. Therefore, the distal end 22 and upset 26 act as bearing surfaces preventing any radial movement of the member 12 within the cylindrical surface 44.

Once the retainer is slid into the locked position, the dust barrier with integral secondary latch is slid axially inward such that legs 76 are positioned between slots 70. It should be noted that legs 76 can only fit between slots 70 when the retainer is in the locked position. As stated earlier, prior to the retainer being in the locked position, the originally rectangular shaped slot 70 is of triangular shape. It is not until the retainer is in the locked position that slot 70 returns to its original rectangular shape. Therefore, until the retainer is in the locked position, leg 70 will not fit between slots 70. This would assure that the retainer is in the locked position during the assembly process.

Hook 82 of leg 76 flexes radially inward upon contact with rim 38 and springs radially outward once it surpasses rim 38, such that axially outward surface 84 abuts radial face 40 to its locked position. Once the dust barrier with integral secondary latch 18 is in its locked position, legs 76 serve to retain the dust barrier 18 on to the female connector body 14 and also serve to prevent accidental release of the retainer 16. Since legs 76 are situated within slots 70, locking beams 50 cannot be sufficiently compressed radially inward for the diameter of the locking beams 50 to be smaller than the diameter of the rim 36, thus, preventing the locking beams 50 from fitting through rim 36.

To remove the male member 12 from the female connector body 14, once the retainer 16 and dust barrier with integral secondary latch 18 are installed, the dust barrier with integral secondary latch 18 must be first disengaged. To disengage the dust barrier with integral secondary latch 18, a radially inward force is applied to the ridged surfaces 86 and sliding the dust barrier with integral secondary latch 18 axially outward. Since the legs 76 are situated directly on the opposite surface of the ridged surfaces 86, axially inward force applied to the ridged surfaces 86 causes the legs 76 to move axially inward. The axially inward movement of the legs 76 allow the radial distance between hooks 82 to be reduced sufficiently to allow hooks 82 to pass through rim 38; thus allowing the dust barrier with integral secondary latch 18 to slide axially outward from the female connector body 14.

Once the dust barrier 18 is released and slid axially outward, the retainer 16 can be disengaged by applying a force radially inward to the finger tabs 62 and then sliding the retainer 16 axially outward from the female connector body 14. By applying a force to the finger tabs radially inward, the diameter of the tapered surface 58 is reduced to be smaller than the diameter of rim 36. This reduced diameter of the tapered surface 58 allows sufficient clearance for the retainer 16 to slide past rim 36. The male member 12 can then be removed from the female connector body 14 by applying an axially outward force to the male member 12.

Figure 10:
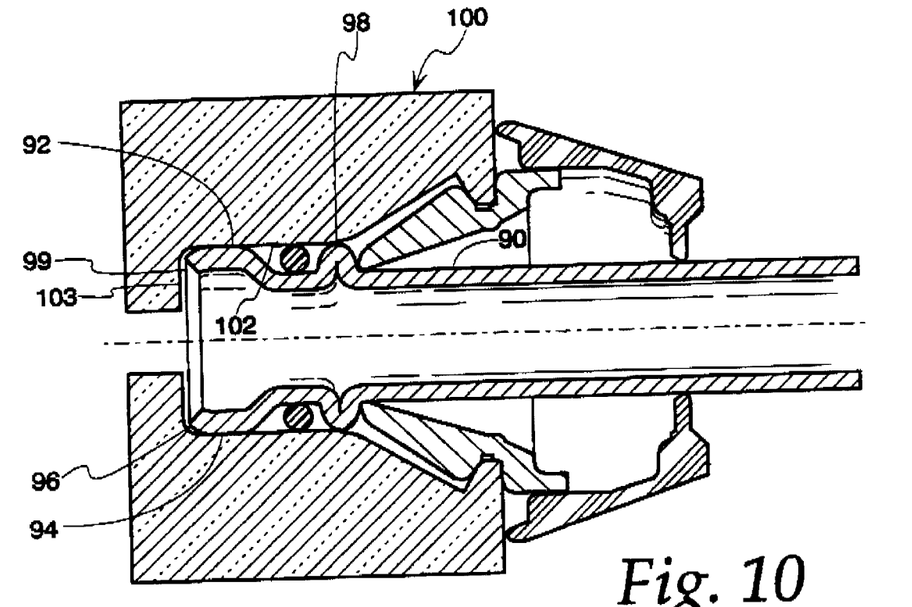
FIG. 10 is a section taken through a second embodiment of a coupling assembly.
Figure 11:
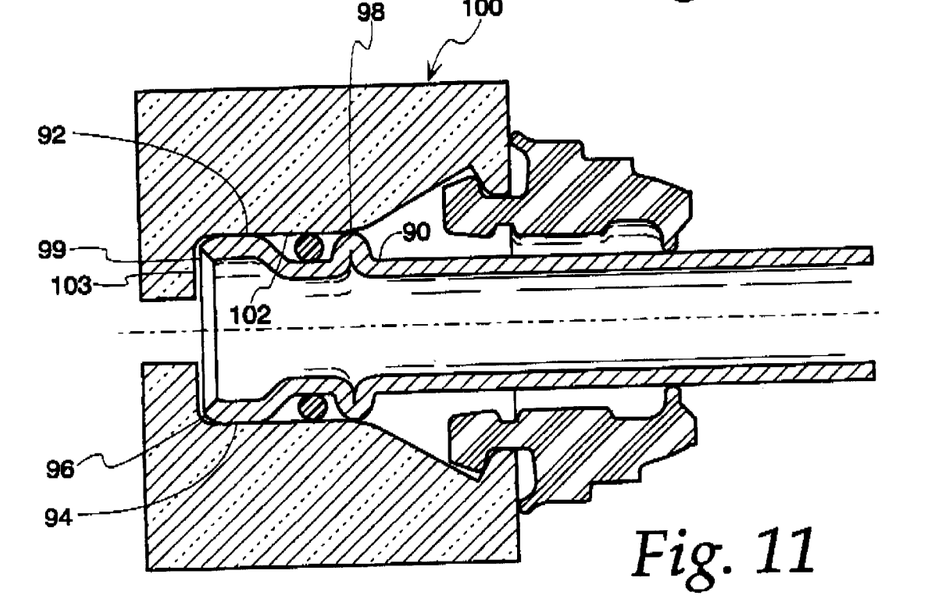
FIG. 11 is a section taken ninety degrees from the coupling assembly of FIG. 10.

FIGS. 10 and 11 illustrate a second embodiment of a coupling assembly of the present invention. The second embodiment is essentially the same the first embodiment with the exception of an enlarged distal end of the male member. Rather than having the distal end terminating in a radially outward extending portion as in the first embodiment, in the second embodiment, the distal end 92 curves radially inward and extends axially to create an enlarged cylindrical bearing surface 94 and then further curves radially inward to create a chamfered surface 96 at the terminal end. As in the first embodiment, the chamfered surface 96 at the terminal end assists in guiding the male member 90 into the female connector body 100. The enlarged cylindrical bearing surface 94 has a diameter approximately the same diameter as upset 98 and slightly smaller than the diameter of the cylindrical surface 102 of the connector body 100. The enlarged cylindrical bearing surface 94 of second embodiment requires more tubing material and additional manufacturing steps for curving the distal end 92 radially inward. Therefore, the male member 90 of this embodiment is more costly to produce than the male member of the first embodiment. Furthermore, the enlarged cylindrical bearing surface 94 requires additional packaging space than the first embodiment due to the additional length of the enlarged cylindrical bearing surface 94. However, the enlarged cylindrical bearing surface 94 does provide additional bearing surface at the distal end 92, which is sometimes necessary where high radial load will be applied to the male member. The additional bearing surface is also sometimes necessary for smaller sized male member requiring a portionally larger bearing surface.

Figure 12:
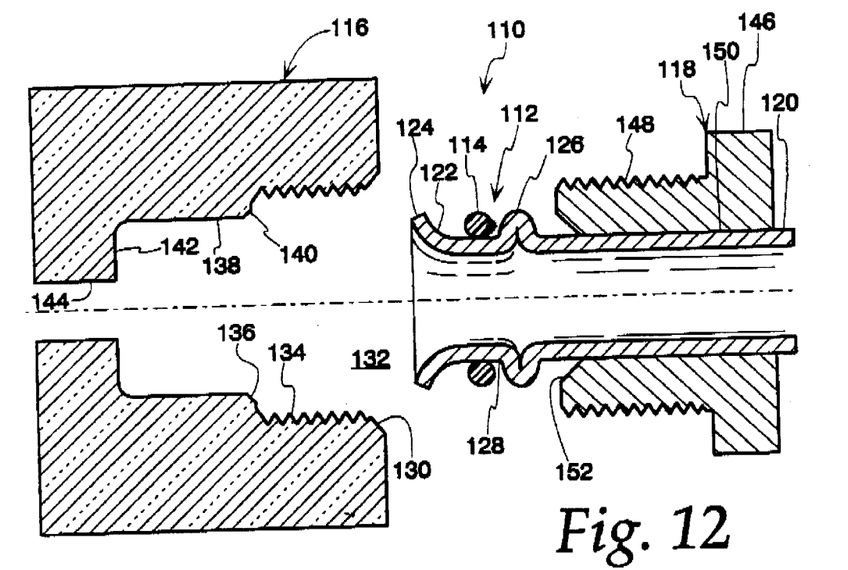
FIG. 12 is a section taken through a third embodiment of a coupling assembly prior to assembling the coupling assembly.
Figure 13:
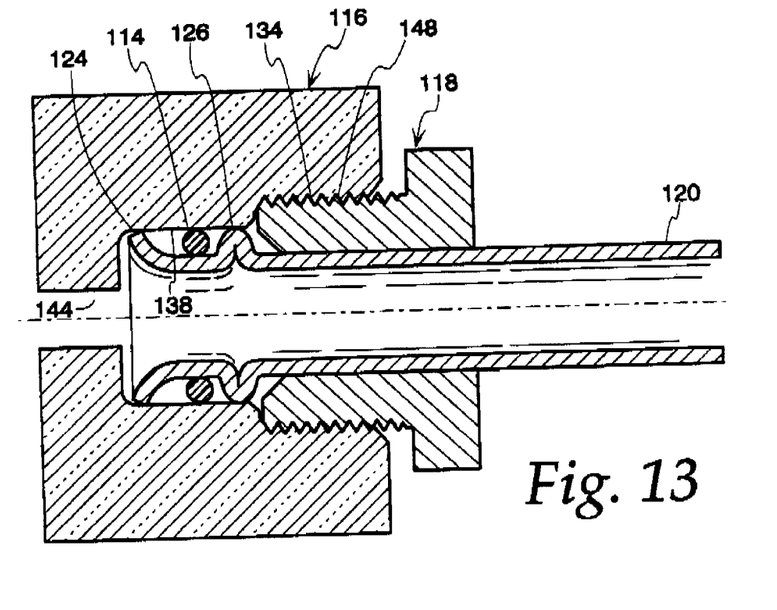
FIG. 13 is a section taken through the coupling assembly of FIG. 12 as assembled.

FIGS. 12 and 13 illustrate a third embodiment of a coupling assembly 110 of the present invention. The coupling assembly 110 of the third embodiment comprises a male member 112, an O-ring 114, a hollow female connector body 116 and a hex head tube nut 118.

The male member 112 is essentially the same as the male member of the first embodiment. Male member 112 is formed at the end of a hollow and rigid tube 120 which forms a part of a fluid line system. The tube 120 may lead to a component in a fluid line system, or may itself be a portion of a component in a fluid line system. Male member 112 has a radially enlarged distal end 122 located at the end of the tube 120. The diameter of distal end 122 is greater than the diameter of tube 120. The terminal surface 124 of the distal end 122 is such that the terminal surface 124 fits snugly within connector body 116. The terminal surface 124 of the distal end 122 is chamfered to facilitate the insertion of male member 112 into connector body 116.

Male member 112 further includes a radially enlarged annular flange or upset 126 formed at a given distance from the distal end 122. The diameter of the upset 126 is approximately equal to the diameter of the distal end 122. Hence, the outer diameter of upset 126 is also such that the upset 126 fits snugly within connector body 116.

A cylindrical channel 128 extends between upset 126 and distal end 122. Channel 128 as an outer diameter equal to the outer diameter of tube 120 and smaller than either the outer diameter of the distal end 122 or the outer diameter of the upset 126. While the snug fit of the distal end 122 and the upset 126 within the connector body reduces the leakage of the fluid system, an O-ring can be used to further reduce the leakage. The O-ring 114 is inserted into channel 128 such that upon insertion of the male member 112 into the connector body 116, the O-ring 114 fits tightly within connector body 116 and channel 128. The O-ring 114 is situated between the distal end 122 and upset 126, thus preventing the O-ring 114 from sliding or rolling axially along the length of the male member 112.

Female connector body 116 is hollow and defines a threaded axial bore 134 extending axially inward from an entrance 132. Entrance 132 is defined by a first conical surface 130. The first conical surface 130 is chamfered to facilitate the insertion of male member 112 into the threaded bore 134 of the connector body 116. The threaded axial bore 134 terminates at a first annular face 140. Axially inwardly from the threaded axial bore 134 is a non-threaded axial bore 138. The diameter of the non-threaded axial bore 138 is smaller than the diameter of the threaded axial bore 134. Located at the junction of the first annular face 136 and the entrance of the non-threaded axial bore 138 is a second conical surface 140. The second conical surface 140 is chamfered to facilitate the insertion of male member 112 into the non-threaded bore 138. The diameter of the non-threaded bore 138 is slightly larger than the outer diameter of the distal end 122 and upset 126 such that when the male member 112 is inserted into the non-threaded bore 138, the male member 112 fits snugly within the connector body 116. The length of the non-threaded bore 138 is approximately the same as the distance between the terminal end of the male member 112 to the axially inward surface of the upset 126. The non-threaded bore 138 terminates at a second annular face 142. Located at the center of the second annular face 142 is the entrance to a reduced diameter cylindrical bore 144 forming the fluid line opposite the tube 120.

The externally threaded hex head tube nut 118 is slidably mounted on the tube 120 and located axially outward from the upset 126. Upon insertion of the male member 112 into the female connector body 116, the tube nut 118 is slid toward the connector body 116 and threaded to the threaded bore 134 of the connector body 116 to secure the male member 112 within the connector body 116.

The tube nut 118 has a hex head 146 and an externally threaded portion 148. The threading of the externally threaded portion 148 is sized to mate with the threading of the threaded bore 134 of the connector body 116. The length of the externally threaded portion 148 of the tube nut 118 is longer than the length of the threaded bore 134 of the connector body 116. A smooth bore 150 is located through the center-line of the tube nut 118. The diameter of the bore 150 of the tube nut 118 is slightly larger than the outer diameter of the tube 120, thus allowing the tube nut 118 to slide along the tube 120. A chamfer 152 is formed at the end of the bore 150 at the terminal end of the externally threaded portion 148. The chamfer 152 facilitates the insertion of the tube 120 into the bore 150 of the tube nut 118. The chamfer 152 also allows the terminal end of the externally threaded portion 148 to abut the upset 126 of the male member 112 without deforming the upset 126.

Figure 14:
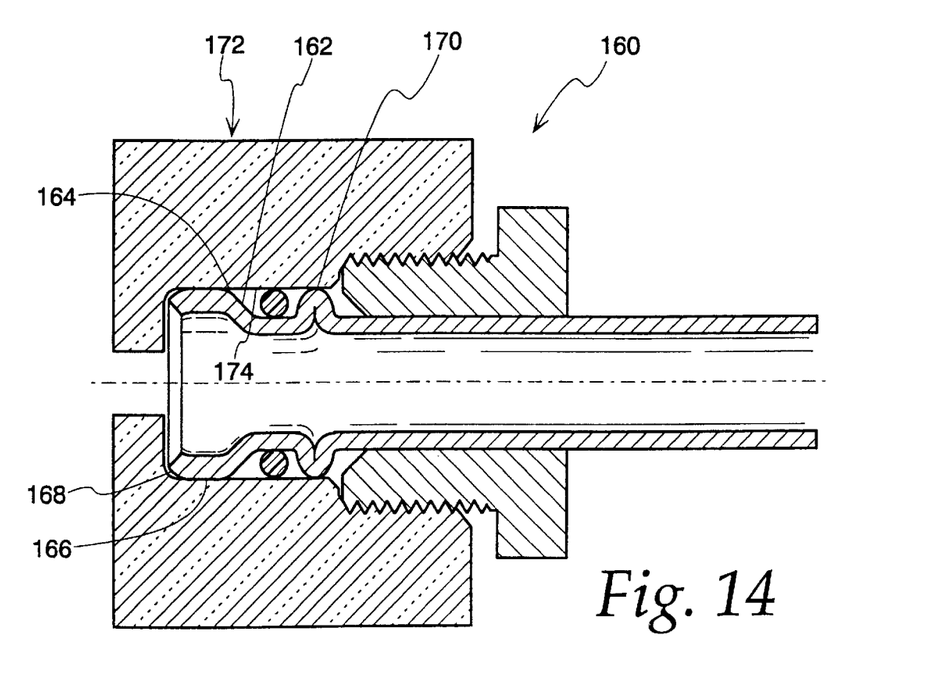
FIG. 14 is a section taken through a fourth embodiment of a coupling assembly.

FIG. 14 illustrates a fourth embodiment of a coupling assembly 160 of the present invention. The fourth embodiment is essentially the same the third embodiment with the exception of an enlarged distal end of the male member. The enlarged distal end of the fourth embodiment is essentially the same as the enlarged distal end of the second embodiment. Rather than having the distal end terminating in a radially outward extending portion as in the third embodiment, in the fourth embodiment, the distal end 164 curves radially inward and extends axially to create an enlarged cylindrical bearing surface 166 and then further curves radially inward to create a chamfered surface 168 at the terminal end. The chamfered surface 168 at the terminal end assists in guiding the male member 162 into the female connector body 172. The enlarged cylindrical bearing surface 166 has a diameter approximately the same diameter as upset 170 and slightly smaller than the diameter of the non-threaded bore 174 of the connector body 172.

Various features of the present invention have been described with reference to the above embodiments. It should be understood that modifications may be made without departing from the spirit and scope of the invention as represented by the following claims.

I claim:

1. A conduit coupling comprising:
    a female connector body defining a bore extending axially inwardly into said connector body from an entrance, a radial face being defined in said bore axially inward of said entrance;
    a male member received within said bore and having a radially enlarged annular upset;
    a retainer having at least two locking beams extending between and engaging said upset and said radial face to retain said male member in said bore, said locking beams defining a slot between said locking beams allowing said locking beams to move radially inward; and
    a dust barrier with integral secondary latch slidably mounted on said male member axially outward of said retainer, said dust barrier having a skirt surrounding said entrance, said dust barrier further having at least one leg extending axially inward into said bore engaging said radial face to secure said dust barrier to said female connector housing, wherein said leg prevents inadvertent radially inward movement of said locking beams by fitting within said slot between said locking beams.

2. The conduit coupling of claim 1 wherein said retainer is slidably mounted on said male member axially outward of said upset.

3. The conduit coupling of claim 1 wherein said leg includes a radially outward extending catch edge for engagement to said radial face to secure said dust barrier to said female connector body.

4. The conduit coupling of claim 1 wherein said retainer further having a finger tab extending axially outward from end of said locking beam allowing said lock beam to move radially inward upon a radially inward forced applied to said finger tab when said leg of said dust barrier is not within said slot.

5. The conduit coupling of claim 1 wherein said dust barrier further having a ridged surface formed on outside surface of said skirt.

6. The conduit coupling of claim 1 wherein said male member further having a radially enlarged distal end.

7. The conduit coupling of claim 6 wherein said male member further having a channel defined between said upset and said distal end.

8. The conduit coupling of claim 7 further comprising an O-ring surrounding said channel of said male member.

9. A method of assembling a conduit coupling comprising the steps of:
    (a) providing a female connector housing defining a bore, said bore extending axially inwardly into said connector housing from an entrance, a radial face being defined in said bore axially inwardly of said entrance;
    (b) providing a male member having a radially enlarged annular upset;
    (c) providing a retainer slidably mounted on said male member axially outward of said upset, said retainer having at least two locking beams, said locking beams defining a slot between said locking beams allowing said locking beams to move radially inward;
    (d) providing a dust barrier with integral secondary latch slidably mounted on said male member axially outward of said retainer, said dust barrier having a skirt with a diameter at least as large as said entrance of said female connector body, said dust barrier further having at least one leg extending axially inward into said bore;
    (e) inserting said male member into said bore of said female connector body;
    (f) sliding said retainer axially inward until said retainer abuts said upset of said male member and engages said radial face of female connector body;
    (g) sliding said dust barrier with integral secondary latch axially inward to engage said radial face of said female connector body such that said leg of said dust barrier prevents inadvertent radially inward movement of said locking beams by fitting within said slot between said locking beams.

10. A method of assembling a conduit coupling as claimed in claim 9 wherein a radial face is defined in said bore axially inward of said entrance, said step of sliding said retainer axially inward until said retainer abuts said upset further causes said locking beam to extend between and engage said upset and said radial face to retain said male member in said bore.

* * * * *